United States Patent

[11] 3,633,281

[72] Inventor Hilmar Vits
 Langenfeld, Germany
[21] Appl. No. 8656
[22] Filed Feb. 4, 1970
[45] Patented Jan. 11, 1972
[73] Assignee Maschinenfabrik VITS GmbH
 Langenfeld, Germany
[32] Priority Feb. 13, 1969
[33] Germany
[31] P 19 07 083.7

[54] PROCESS AND APPARATUS FOR HANDLING WORKPIECES WHICH HAVE A LARGE SURFACE AREA RELATIVE TO THEIR THICKNESS
20 Claims, 15 Drawing Figs.

[52] U.S. Cl. .................................................... 34/1,
 34/10, 34/156, 226/7, 226/97
[51] Int. Cl. ...................................................... B01k 5/00
[50] Field of Search ........................................... 34/1, 10,
 156; 226/7, 97

[56] References Cited
UNITED STATES PATENTS
2,848,820 8/1958 Wallin et al. ................. 34/156 X

| | | | |
|---|---|---|---|
| 3,181,250 | 5/1965 | Vits .............................. | 34/23 |
| 3,272,415 | 9/1966 | Wallin .......................... | 226/97 |
| 3,304,619 | 2/1967 | Futer ............................ | 34/10 |
| 3,384,282 | 5/1968 | Vits .............................. | 34/156 X |
| 3,449,836 | 6/1969 | Schreiber et al. ............. | 34/1 |

*Primary Examiner*—Carroll B. Dority, Jr.
*Attorney*—Michael S. Striker

ABSTRACT: The workpieces are contacted at least on one side with a gaseous and/or vaporous fluid and are at least maintained in a floating condition during treatment of the workpiece. The fluid is transformed into source flows which are distributed over the workpiece surface contacted by the flowing fluid. The source flows are expanded so that they have divergent radial jets extending from said source in a top plan view taken onto said workpiece surface contacted by the flowing fluid. A slight convexity toward said workpiece is imparted to said divergent radial jets in a view taken at right angles to the first-mentioned direction of view and the direction of flow and parallel to a center plane of the workpiece. The radial jets which are convex toward the workpiece are subsequently transformed into a plane flow, which is parallel to tee center plane of the workpiece.

Inventor:

PROCESS AND APPARATUS FOR HANDLING WORKPIECES WHICH HAVE A LARGE SURFACE AREA RELATIVE TO THEIR THICKNESS

This invention relates to processes and apparatus for guiding and/or conveying workpieces in a floating condition, which workpieces have a large area relative to their thickness, such as webs, sheets, endless and finite sheeting of paper, plastics material, textile fabrics, metals, metal alloys or the like. The term sheeting when applied to paper covers also paperboard and when applied to plastics material is particularly directed to synthetic resin. The webs may consist of textile fabrics, such as woven fabrics, knitted fabrics, plaited fabrics, nonwoven fabrics, entangled fiber webs, matted fiber webs, felted fiber materials or the like, with or without a coating.

Such processes and apparatus in which the material is guided and/or conveyed in a floating condition by means of a unilateral pneumatic flow of a gaseous and/or vaporous fluid, such as air, and in this condition is passed through treating apparatus, such as dryers, homogenizing plants, conditioning plants etc., are known per se.

In these processes and apparatus, three main concepts have been embodied. The first concept is characterized by the formation of an air cushion and a generation of alternating successive flow peaks on both sides of the web to compensate forces of gravity and lifting forces and to balance such forces whereas forces which urge the web out of its direction of travel are compensated by transversely directed flow forces, which may be produced by special nozzles or by the use of nozzles producing lateral components of force. The second concept, which is also successful, gives the same results by the utilization of the special conditions of flow which occur at airfoil sections. A third concept calls for the use of slot nozzles, which extend throughout the width of the web and discharge fluid on both sides, in conjunction with crossflow nozzles tending to extend the web in the direction of its width so that forces of gravity and lifting forces may be caused to compensate each other and to guide the workpiece in a floating condition through the treating space and to convey the workpiece, if desired, without contact of the workpiece with nozzle-forming and other walls. To provide the crossflow nozzles, blow box walls facing the workpiece are provided in rows in a staggered arrangement and are depressed in wedge shape to form outlet slots, which extend transversely to the direction of conveyance and are defined by the back of each wedge. It is common to all concepts that fluid flows into contact with the web from both sides of their mutually opposite boundary surfaces so that the web can be guided or conveyed in a floating condition. Such a flow into contact with both sides cannot be used in all cases. For instance, sheeting is known which is coated on one side with a material which is so delicate that it does not permit of a contact by a flowing fluid without permanent deterioration of the coating. This recognition leads to the object to provide a process for guiding such webs in a floating condition and apparatus for carrying out such process, in which process and apparatus a guidance and/or conveyance of the web in a floating condition is enabled even when the web is contacted by a flowing fluid only on one side and without an occurrence of lifting forces which can be compensated only by the opposing action of fluid flows produced on the other side of the web to stabilize the floating web in position. This leads to the specialized problem to enable such a high degree of control of the lifting forces that it is possible just to balance the opposing forces acting on the web and, if desired, to exert the forces required for a guidance and/or conveyance, whereas no forces arise which would disturb the equilibrium of forces and would result in an unstable position of the web.

These general and more specific objects are accomplished according to the invention in that the flowing fluid is transformed into source flows, which are distributed over the workpiece surface in contact with the flowing fluid and which in a top plan view of the workpiece surface expand like sectors and have divergent edge jets whereas in a view taken at right angles to the first direction of view and to the direction of conveyance and parallel to the center plane of the workpiece each of said source flows is produced to have a slightly convex course from the source toward the workpiece and is subsequently transformed into a flow which is parallel or approximately parallel to the boundary surface of the workpiece.

This solution is based on a recognition which underlies the invention and resides in that the presence of said divergent edge jets gives rise to an expansion in the area defined by said edge jets and said expansion results in pressures which are lower than the pressures which prevail in the source area and in the remaining flow area so that forces directed toward a solid wall which defines the divergent flow area can be derived from the resulting pressure differentials. Hence, lifting forces are generated in that flows having a convex course are produced and are subsequently transformed into a flow which is parallel to the workpiece surface contacted by the flowing fluid and said forces can be more or less compensated. The convexity can be adjusted by the selection of the radius of curvature in that blow box wall which is convex relative to the center plane of the web and by the selection of the three-dimensional position of the center of curvature, which in a three-dimensional system is one of the aligned points of a straight line extending at right angles to the direction of conveyance. The flow may be only slightly convex before it is transformed into the parallel flow so that the lifting forces are so small that they can be compensated by the above-mentioned pressure differentials and can be controlled just as the divergent flow which is used to produce the pressure differentials. It has been found that said angle of divergence may be selected to produce the required pressure differentials between the flow pressure in general and the flow pressures in the divergent flow area. Two limiting angles have been found. If the angle of divergence is 180° and less, the web has a pronounced tendency to contact the nozzle-forming blow box wall so that forces which correspond to the forces of gravity and the pressure differentials and which are directed toward the nozzle-forming blow box wall exceed the oppositely directed forces, which are too small for a compensation of the first-mentioned forces and thus for a sufficient stabilization of the position of the web. The other limiting angle of 90° and more results in lifting forces which are so strong that the web lifts from the blow box wall so that there is a risk of a contact with solid walls which define the treating space on the other side. These limiting values are substantially independent of parameters which are less significant, such as the absolute dimensions of the nozzle, the configuration and area of the smallest cross section of each nozzle, the design of the blow box wall in other respects, etc. Experiments have shown that a desirable range for the angle of divergence between the edge jets is the range from 105° to 135° and that a remarkable optimum of the angle of divergence is at 120° although this optimum may be slightly shifted upwardly or downwardly with a view to the above-mentioned boundary conditions.

The nozzle design which has been provided by the invention enables for the first time a solution to the problems which arise in microwave-drying operations because the workpiece to be dried must be moved between the microwave electrodes without any contact therewith.

Microwaves have the great advantage that the moisture content of web material can be effectively evaporated even if the moisture is concentrated in localized areas or irregularly distributed and a uniform product is nevertheless required. Although electric power is required for such operations, the equipment is expensive, and power from normal supply systems can be converted into microwave power only with an efficiency of only 50 percent, an economical operation is enabled because microwave energy acts where a temperature rise and evaporation is actually desired.

The efficiency of the operation will be the higher, the higher is the ratio between the thickness of the material and the electrode spacing. Hence, a very small electrode spacing is selected. Because official regulations permit of an operation of microwave systems only at predetermined frequencies, such as 5,800 megacycles per second, corresponding to a wavelength of 52 millimeters, and the electrode spacing should be one-fourth of the wavelength for an optimum action of the electrodes, the electrode spacing in the above example will be about 13 millimeters. Other permissible frequencies are less than 50 percent of more than 200 percent of the frequency stated above by way of example so that the spacing may be so large as to result in a poor utilization of energy or so small that considerable difficulties arise in the manufacture of the electrodes and in the operation of the dryers because of the small size of the slots for the passage of the workpiece.

A wider application of microwave drying has been prevented so far by a small electrode spacing and an unreliable control of the web between the electrodes because it has not been possible to guide the web between the electrodes without contacting the latter. Particularly webs which dry irregularly tend to form waves or curled edges or to exhibit other undesirable phenomena during the final phase of the drying operation so that there is an electrode contact even during normal operation, the free course of the web is disturbed, the web may be subjected to a turbulent flow and other disturbances may occur.

Microwaves are used mainly to dry valuable and delicate coatings, such as photographic emulsions, prints of multicolor rotary printing presses for wet-in-wet operation, coatings on artificial leather, microfoam coatings on copy paper which may be used without carbon paper, and the like. In order to improve the treatment of such delicate products, special plants have been developed, in which rolls are disposed on different levels between adjacent electrodes disposed under the web and guide the web along a polygonal path. This solution is not satisfactory because it may be used only for webs which are coated on one side or which are delicate. It has also the disadvantage that the electrode spacing must be increased greatly to provide space for the rolls so that the maximum energy density is too low for an economical operation.

The vapors which are generated during the drying operation adversely affect said operation because they reduce its efficiency. For this reason, it has been proposed to provide air supply pipes and ducts, which have nozzlelike openings between adjacent electrodes on one side of the web and discharge air onto the web and displace any existing vapors, e.g., into a housing which surrounds the electrodes and from which the vapors can easily be removed.

It is also known to use the hollow conductor of the electrodes themselves as an air duct and to provide the air supply means, the exhaust means and the electrode portion facing the web with insulators having openings from which the scavenging fluid, preferably air, is discharged onto the web.

Hence, the development of microwave dryers has resulted in installations which are similar to modern nozzle dryers and it has been endeavored to use a scavenging fluid both for a removal of vapors and to produce aerodynamic conditions causing the web to float. Whereas such microwave dryers have been claimed to accomplish that object, this claim has not been substantiated in practice so far.

Among numerous nozzle dryers having nozzles operable to enable the guidance of a web in a floating condition between the nozzles, only a few exceptional embodiments actually enable a guidance of a floating web in practice. Even these few useful systems cannot be used in microwave installations because in addition to the above-mentioned functional problem they must have the required free area in spite of the fact that their dimensions must be reduced. In a nozzle dryer, the free area is the ratio of the nozzle outlet cross sections from which fluid is blown into contact with a surface to be dried to the area of said surface to be dried. With normal nozzles operable to maintain a web in floating condition, the free area is within the range of 1.5–3.5 percent, preferably 2–3 percent. If such dryers provided with nozzles operable to maintain a web in floating condition were used in a microwave installation, the required volumetric flow rates would be so high that the air ducts for handling such rates could no longer be accommodated between the electrodes so that the object could be accomplished only with a free area of or below 1 percent, possibly 0.5 percent. This requirement cannot be met with the known systems. The novel nozzle designs proposed according to the invention enable this requirement to be fulfilled. This will be shown with reference to embodiments of the invention, which are shown by way of example on the drawing and will be described hereinafter.

Figure 1:
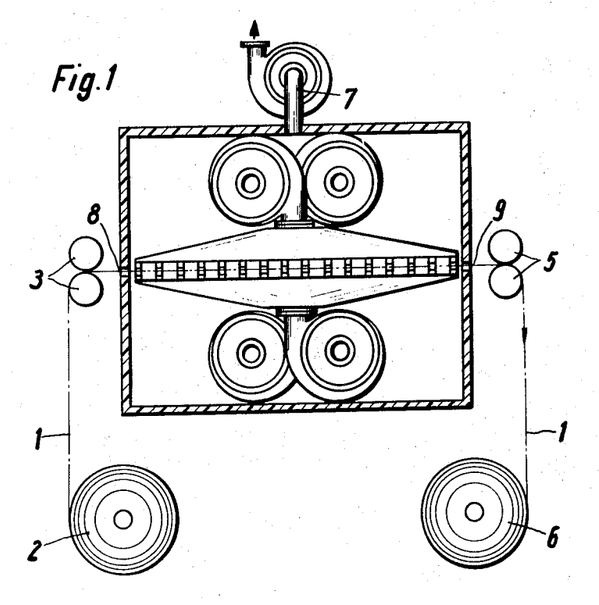
FIG. 1 is a diagrammatic side elevation showing an overall installation.

FIG. 1 is a diagrammatic representation showing a web 1 to be treated and an uncoiler 2 preceding the plant. The web 1 is fed by a pair of feed rolls 3 preceding a dryer 4 and a pair of feed rolls 5 succeeding the dryer 4 and after the drying operation is wound up by a coiler 6. The dryer housing 4 is provided with an exhauster 7, which sucks vapor-laden air from the housing 4 and ensures a continuous inflow of fresh air through inlet and outlet slots 8 and 9 of the dryer.

Figure 2:
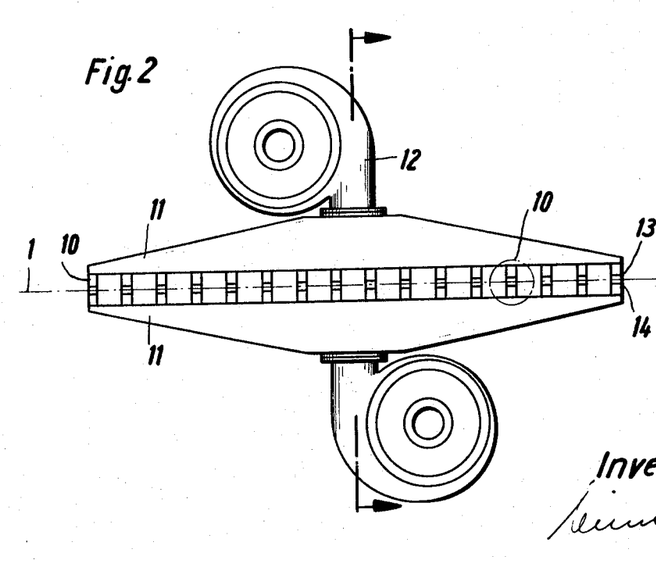
FIG. 2 is a side elevation showing the electrode section with air supply and exhaust means.

FIG. 2 is a diagrammatic view showing the interior of the housing 4. The web 1 extends horizontally from the left to the right. The line which represents the web 1 is also a plane of symmetry for the electrode and air system which lies above and below the web 1. Series of electrodes 10 are respectively arranged on opposite sides of the web 1. The electrodes 10 are succeeded by air-distributing boxes 11, which are connected to blowers 12, which force air into the distributing boxes 11. The junctions between the air-distributing boxes 11 and the electrodes 10 are formed with open cross sections whereas the walls are closed otherwise so that the air from the blowers is forced into the hollow conductors of the electrodes 10 and discharged from upper nozzles 13 disposed above the web 1 and from lower nozzles 14 disposed below the web 1. The air then escapes into the interior of the housing 4.

Figure 3:
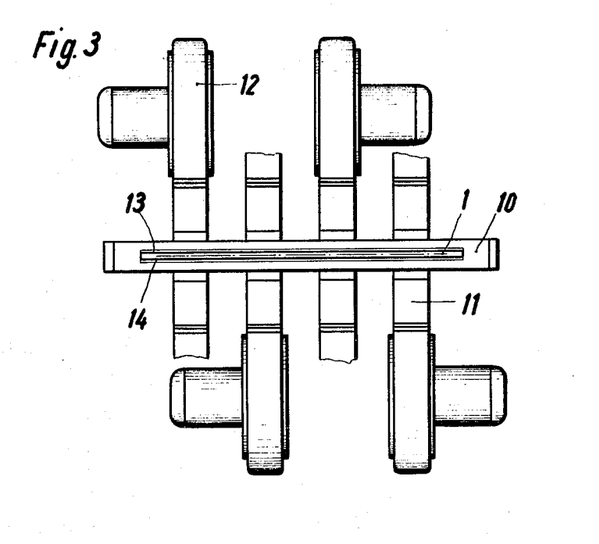
FIG. 3 is a view taken in the direction of travel of the web and shows the overall arrangement.

FIG. 3 is a sectional view which is taken transversely to the web through an electrode 10, viewed in the direction of travel. For the sake of a simpler showing, the upper and lower electrodes 10 are shown to consist of a unit of construction. In practical embodiments the electrode unit may be arranged so that it can be swung open so that the spacing between the upper and lower electrode systems may be temporarily increased to improve the threading of the web, particularly in machines which operate at a high speed or start with a high acceleration. In a simplified arrangement in which the electrodes disposed on opposite sides of a given portion of the web consist of a unit, the metal part of the electrode 10 is slotted and divided into a plurality of upper nozzles 13 and lower nozzles 14 and sealed by lateral seals 15 so that air from the blowers can escape only through the nozzles 13 and 14 toward the web. Air-distributing boxes 11 are disposed above and below the electrodes 10 and supply air from the blowers to the cavities of the electrodes 10 and at the same time to all other electrodes preceding and succeeding the electrodes 10 in the direction of travel of the web. The air which is discharged by the nozzles 13 and 14 can easily escape from the distributing boxes 11. The blowers 12 are staggered.

Figure 4:
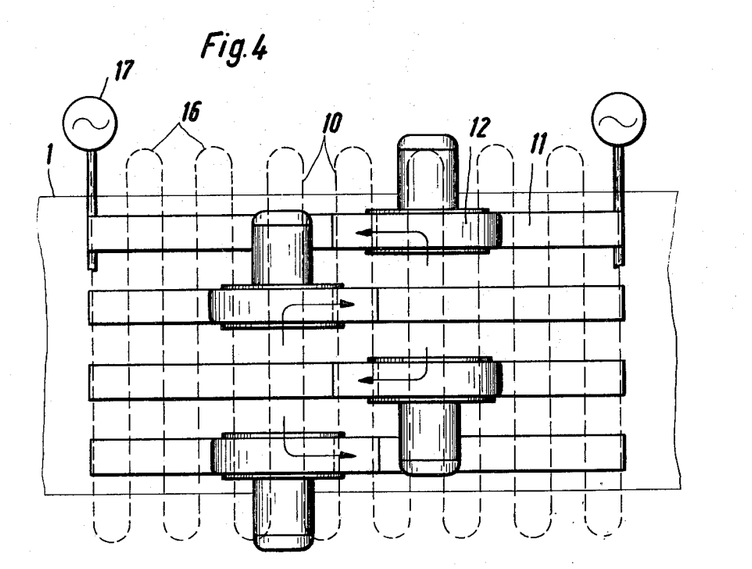
FIG. 4 shows the overall plant in a top plan view taken on the web.

FIG. 4 shows the electrode system in a view taken at right angles to the plane of the web 1. The blowers 12 are staggered in such a manner that they do not structurally interfere with each other. Within the scope of the invention, a common air supply means may be connected to all air-distributing boxes 11, particularly when heated air is to be used so that the blower motors should not be incorporated in the interior of the housing 4.

Besides the electrodes 10 which extend transversely to the web 1 are provided at their end with arcuate connectors 16 to form a long microwave guide to means 17, are connected for supplying microwave power to the electrodes.

Figures 5, 6:
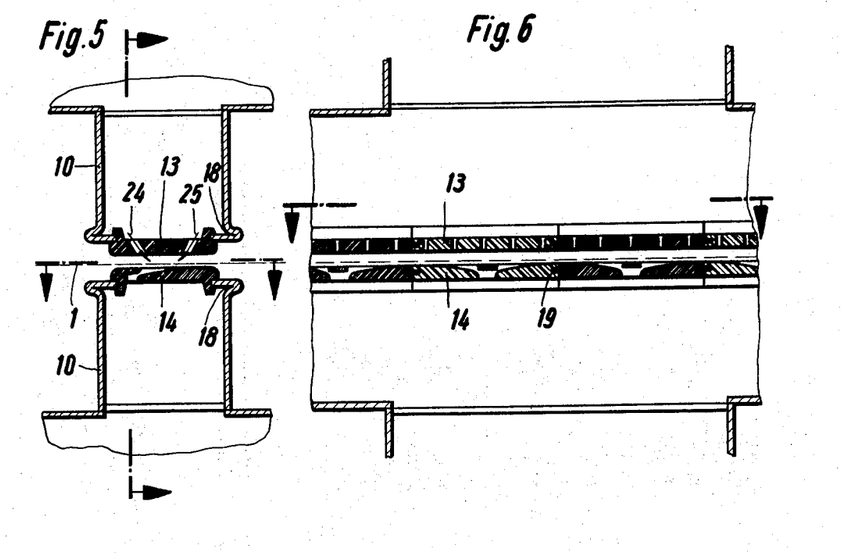
FIG. 5 is a transverse sectional view taken through two opposite electrodes at right angles to the web and in the direction of travel of the web.
FIG. 6 is the corresponding longitudinal sectional view taken transversely to the direction of travel of the web.

FIG. 5 is an enlarged sectional view taken through an individual electrode 10. A slot is left for the passage of the web 1 so that cross sections of the electrode disposed above and below the web face the open portion of the web 1. The end portions of these profiles are shaped to form a fixing edge 18 for the nozzles 13 and 14. These profiles may be shaped by a folding of sheet metal or by pressing.

FIG. 6 is a longitudinal sectional view taken through the electrodes 10 and the upper nozzles 13 and the lower nozzles 14. These elements consist of individual pieces in the form of insulators having a low-loss factor, e.g., of tetrafluoroethylene. These parts may be mass produced by injection molding, or they may consist of aligned, small shaped elements. A seal required in the longitudinal direction between such shaped elements may be mechanically provided by grooves and a feather 19 inserted into them.

Figure 7:
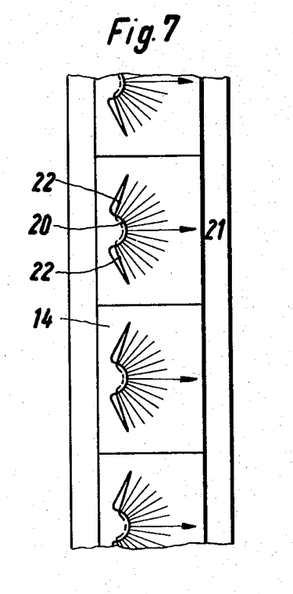
FIG. 7 shows a lower nozzle, which is disposed below the web and constitutes an electrode cover.

FIG. 7 is a top plan view showing the lower nozzles 14. These nozzles have a discharge slot 20, which extends in the plane of the web and has a semicircular or approximately semicircular configuration. The jet of discharged air has the main flow direction 21, which is in the plane of symmetry of the nozzle and actually is only the resultant of a multiplicity of individual radial jets, which are distributed over an approximately semicircular sector and continuously merge into each other. Boundary areas of the sector flown through by the air are represented by curved surfaces 22, by which the nozzle outlets merge into the nozzle walls which define the nozzle passage and the nozzle outlets.

Figure 8:
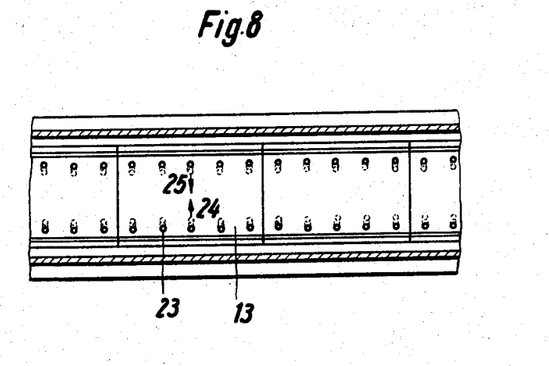
FIG. 8 shows an upper nozzle, which is disposed above the web and constitutes also an electrode cover.

FIG. 8 shows the upper nozzle 13 in a view taken in the direction of flow. Each upper nozzle has two series of openings 23. The openings 23 of adjacent upper nozzles 13 are aligned. Every two openings 23 which are opposite to each other produce air jets 24 and 25, which are directed toward each other with an inclination to the plane of the web 1 (see also the top of FIG. 5). These jets are deflected by the web 1 and flow toward each other so that they obstruct or oppose each other. The obstructing action results in the formation of zones of compressed air or air cushions so that an air cushion effect is produced at the upper nozzle and the web 1 is urged away from the surface of the upper nozzle 13. There is no need for a continuous slot (FIG. 10 of U.S. Pat. 3,181,250) for producing this effect, because rows of individual openings are sufficient, provided that their spacing in each row is smaller than the distance between the rows.

Figure 9:
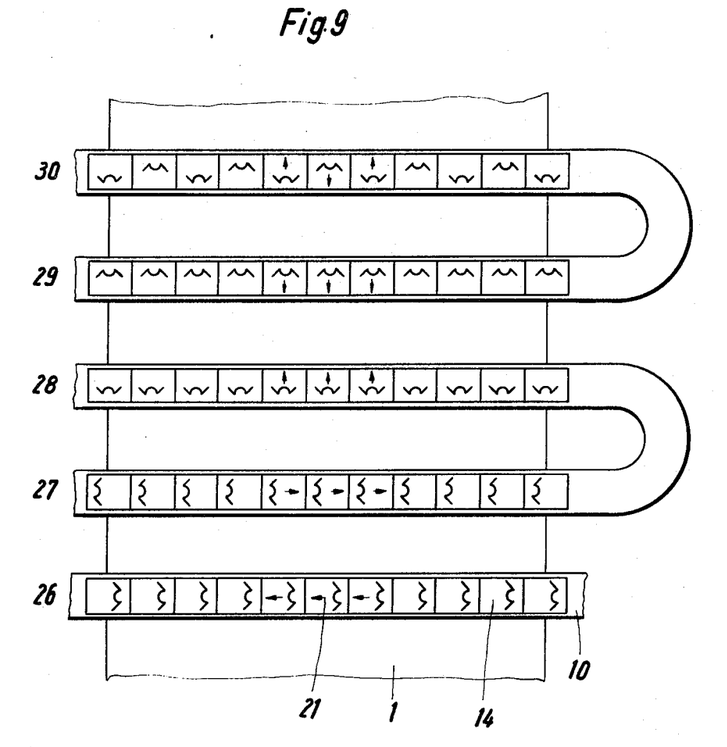
FIG. 9 shows different possible arrangements of the nozzles shown in FIGS. 5 to 7 relative to the web so as to produce different airflow directions.

FIG. 9 shows a web 1 and a series of electrodes 10, which are provided with lower nozzles 14. The main airflow directions 21 are indicated in the drawing. The main direction of the air flowing from row 26 is from the right to the left, the main direction of the air flowing from row 27 is from the left to the right, the main direction of the air flowing from the row 28 is the same as the direction of travel of the web, the main direction of the air flowing from row 29 is opposite to the direction of travel of the web, and the main direction of the air flowing from row 30 is alternatingly the direction of travel of the web and the opposite direction. All these arrangements are operative. A slightly higher air pressure results also in a conveying effect in the main direction of air flow so that a repeated action of air flowing in one and the same main direction may result in desirable and undesirable actions on the web. An arrangement 28 producing an airflow only in a main direction which is the same as the direction of travel of the web will result in a reduction of stresses, an arrangement 29 producing an airflow only in a main direction which is opposite to the direction of travel of the web will result in increased stresses in the web in the direction of travel thereof. If the main airflow direction is always from the right to the left, as is the case with the air discharged by row 26, the addition of the nozzle actions in the main air flow direction will result in a thicker cushion then the flow of air from, e.g., row 28 or 29, but the web is pulled slightly to the left so that the air discharged from the next row or rows 27 in the opposite main airflow direction may be used to compensate the forces which tend to displace the web transversely to its longitudinal direction. In practice it has been found even for delicate webs that the repetition of a row such as 28 which discharges air in a main airflow direction which is the same as the direction of travel of the web is desirable for the overall installation. In this case, the web can be threaded through the dryer without need for special devices for this purpose. If the leading end of the web is stiffened, e.g., by a carton, or is preceded by an adhered piece of a sufficiently stiff, flat material, the web will be pneumatically threaded by the entire action of the main blower air.

Figure 10:
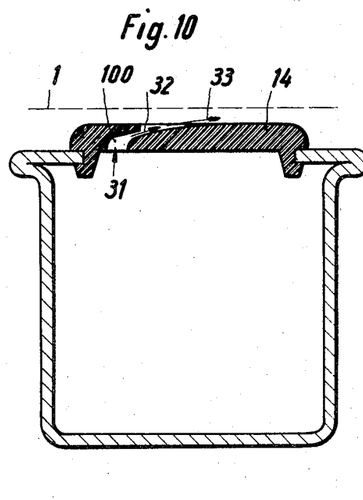
FIGS. 10 and 10a are transverse sectional views taken through the axis of symmetry of a lower nozzle.
Figure 10A:
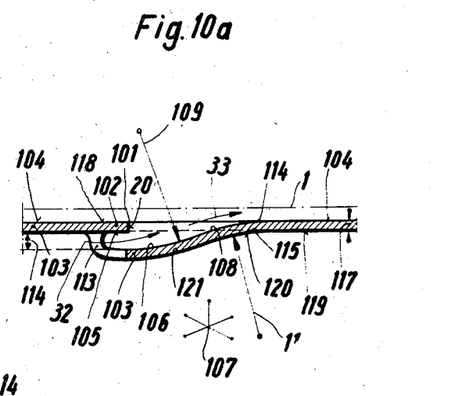

FIG. 10 is a detailed view showing an example of a lower nozzle 14. The fluid delivered by the blower flows through the supply conduit 31 to the lower nozzle 14 and forms a slot-confined flow 32, in which the fluid has its maximum energy. The fluid flows then as a Venturi jet 33 over the slightly convexly curved surface of the lower nozzle 14. The lower nozzle 14 has such a shape that the Venturi jet 33 is spread over a semicircle and together with the web forms a Venturi nozzle, which by its flow energy sucks the web to the lower nozzle 14 except for a small gap for the Venturi jet 33.

Figure 11:
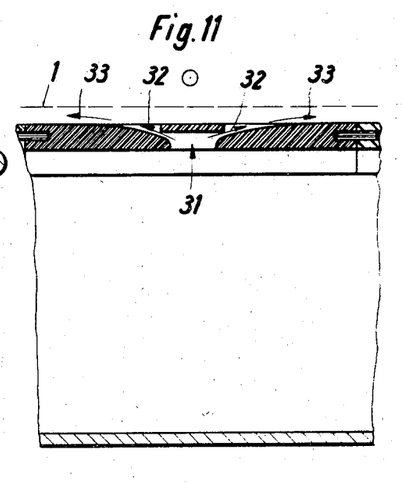
FIG. 11 is a longitudinal sectional view taken through the lower nozzle transversely to the axis of symmetry.
Figure 12:
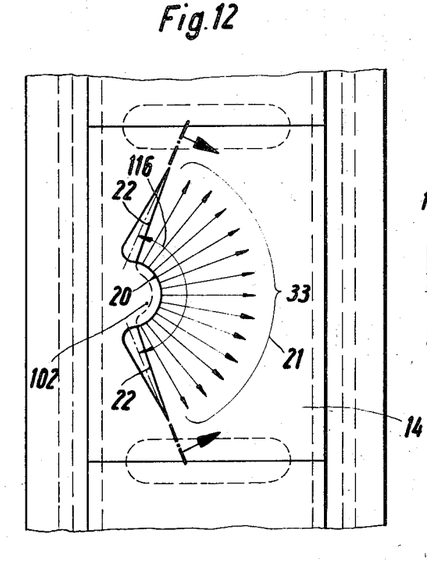
FIG. 12 shows a lower nozzle in an elevation taken in the direction toward the discharge end.

FIG. 11 is a sectional view taken through the lower nozzle 14 at right angles to the plane of the web and in the boundary regions 22 shown in FIGS. 7 and 12. The supply conduit 31 is centrally disposed. The slot-confined flow 32 is uniformly distributed on both sides throughout the sector surface between the boundary areas 22. The same remark is applicable to the Venturi flow 33.

FIG. 12 is an elevation showing the lower nozzle 14 as viewed at right angles to the web plane, with the semicircular air discharge opening 20, the main airflow direction 21 and the boundary areas 22. The Venturi flow 33 can be represented only by a number of arrows corresponding to continuously merging jets flowing between the boundary areas 22 so that these jets cover a large part of the area of the lower nozzle 14 and produce a sufficiently great effect. The divergence of the Venturi flow 33 results in an extreme increase of the Venturi effect and this increased Venturi effect results in the progress which can be achieved by the use of the invention.

The following detailed explanations are given with reference to the design of the nozzles shown in FIGS. 10, 10a, 11 and 12 and operable to produce a floating condition.

Figure 13:
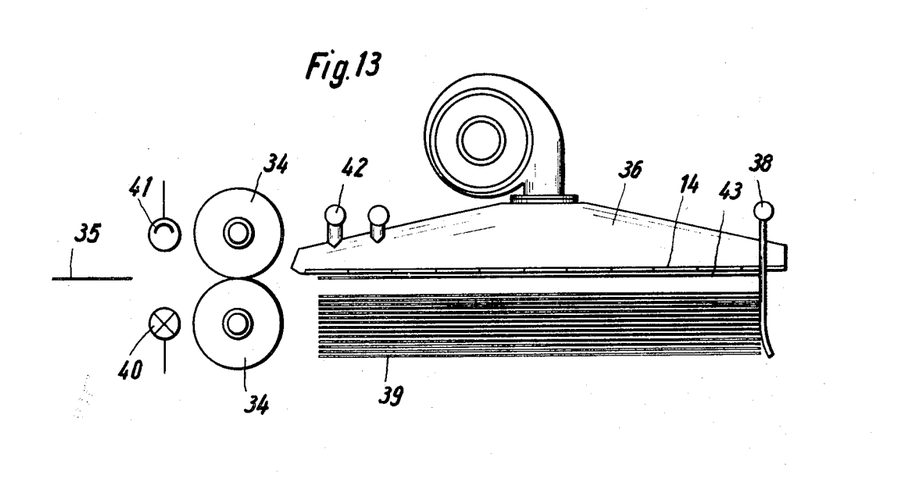
FIG. 13 represents an illustrative embodiment of the invention in which nozzles formed according to the invention are used for an operation in which floating sheets are stacked.
Figure 14:
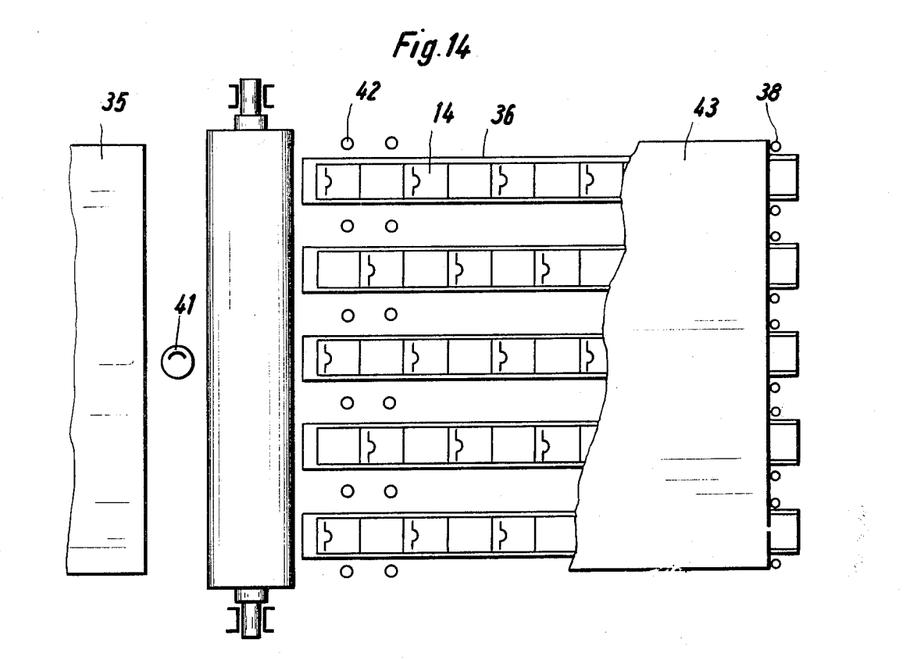
FIG. 14 shows the apparatus of FIG. 13 in a bottom plan view taken toward the nozzles for producing floating conditions.

The nozzle body 14 is formed with a cavity 100, which serves to produce a slot-confined flow 32 and a succeeding Venturi flow 33. The cavity 100 may be formed by various methods, e.g., by molding if the nozzle body consists, e.g., of a dielectric, for instance, a synthetic resin, such as tetrafluoroethylene, to provide electrodes of a microwave dryer as shown in FIGS. 1 to 8. In different types of nozzles, such as shown in FIGS. 13 and 14, which will be described hereinafter, the nozzles may be formed by a punching and pressing tool in the nozzle-forming wall, which in most cases consists of a sheet metal element. To this end, a cut which corresponds to the arcuate line 20 in FIG. 12 is formed in the sheet metal. For instance, these sheet metal walls may define a bar-shaped element which in FIGS. 5–7 is designated 10. In this case, however, nozzle bodies 13 and 14 made of materials other than the sheet metal 10 are not inserted into the U-shaped walls but the web which connects the limbs of the U consists of the same sheet metal as the lateral walls 10. The cut 20 formed by punching in the sheet metal wall 103 in the sectional view of FIG. 10a forms an intersection 101 with the upper boundary surface 104 of the wall 103, which surface faces the workpiece. In the top plan view of FIG. 12, the same cut formed by punching has the configuration of the arc 20, which has been mentioned several times and which in its intermediate portion may consist of an arc of a circle. The sheet metal sidewalls 10 in FIGS. 5 to 7 are connected by a web, which has a portion 102 that is enclosed by the cut 20 formed by punching. In the sectional view of FIG. 10a, this portion 102 forms a protruding, almost semicircular tongue 102 having an upper boundary surface 118, which lies in a plane with the adjoining upper boundary surfaces 104 of the wall 103. The same remark is applicable to the lower boundary surface 105 of the tongue 102 in relation to the adjoining boundary surface 119 of the wall 103. The punching and pressing tool is designed so that the wall 103 has a portion which radially adjoins the tongue 102 and lies between the outwardly curved transitional surfaces 22 shown in FIG. 12 and has been depressed into the cavity 107 disposed below the surfaces 105, 119. Viewed from the cavity 107, this surface portion is slightly concave within a portion 106 which directly adjoins the edge formed by the punching cut and slightly concave in a portion 106 which succeeds in the direction of flow. The boundary surface 110 of the nozzle-forming portion of the wall 103 faces the workpiece. The radius of curvature of the entire boundary surface 110 is designated 109 for the concave portion and the radius of curvature of the boundary surface 111 remote from the workpiece is designated 112 for the concave portion 108. The concave surface portion 106 facing the workpiece is in register with the concave surface 121 remote from the workpiece. The convex surface portion 108 facing the workpiece 1 is in register with the surface 120, which is remote from and convex toward the workpiece 1. This arrangement results in an outlet slot 113 for the gaseous and/or vaporous fluid which is contained in the space 107. The height of said slot, measured at right angles to the center plane of the workpiece 1, is indicated at 114 in FIG. 10a. FIG. 12 indicates that those portions of the wall 103 which face the workpiece with the surface portions 110, 106, 108 and 104 are substantially sector-shaped and that portion which has been depressed by the tool is laterally defined by the radially extending, outwardly curved transitional surfaces 22 (FIG. 12). The center lines of the curved surfaces may be designated as radius vectors, which include an angle 116, which determines the divergence of the expanding gaseous and/or vaporous fluid which flows out of the arcuate slot 113. As is also apparent from FIG. 10a, the upper boundary surface 108 of the wall 103 is convex toward the workpiece 1 and merges directly into the upper boundary surface 108 of the wall 103 at 114'. The surface portion 104 is planar and parallel to the center plane of the workpiece 1 so that a line which corresponds to point 114' and which defines the sector-shaped area 33 by an arc which is equidistant to the arc of the edge 20, 101 formed in the tongue 102 by the punching cut can be recognized virtually only from light and shadow effects and must be considered only theoretically present. In any case, the formation of sharp edges involving a danger of a formation of eddies and of a separation of the flow is avoided. This remark is particularly applicable to the areas 22. FIG. 12 indicates the portion 33 of the sector-shaped boundary surfaces 110, 106 108 and 104 of the wall 103 and the point 115, which lies on the inner boundary surface 120 in register with the outer inlet point 114' or the inlet line 114' between the convex surface portion 108 in FIG. 10a and the planar boundary surface 104 of the wall 103, also the gradual transitions 22 between that portion of the wall 103 which in FIG. 12 is shown as a sector-shaped, curved depression, and the angle 116, which is the angle of divergence of the flow which has been discharged from the nozzle slot 113.

It has already been mentioned that it will be possible to provide the required boundary conditions by the selection of suitable values for the remaining parameters. It has proved desirable, e.g., to select radii of curvatures 109, 112 which are a multiple of the radius of curvature of the cut 20 formed by punching. It will also be desirable to select for the nozzle slot a height 114 which is, at most, one-third of the radius of curvature of the cut 20 formed by punching. On the other hand, the height 114 of the outlet cross section should not be less than one-twentieth of said radius of curvature of the cut 20 formed by punching. If the thickness 117 of the wall 108 has the usual value, the height 114 of the nozzle slot will be of the same order as said thickness. It has already been pointed out that the edge 20 formed by the punching cut and also the outlet slot 113 have an arcuate configuration. An intermediate arc of a circle is only one possible embodiment and other configurations, such as compound arcs, may also be selected. Where arcs of a circle are selected, the series of lines 20, 101 and 114, 115 are concentric. Otherwise the arcs are equidistant, although this is not essential because it may be desirable, e.g., to produce asymmetric flows, e.g., when coatings having an irregular thickness are formed on the workpiece so that the web would tend to wander from the general direction of conveyance or travel or to become displaced from the longitudinal centerline of the path. Such phenomena might be prevented by an asymmetric configuration of the parts, lines, surfaces, surface portions and angles which have been described. The symmetries which are illustrated by way of example must be understood also only in respect of one of the parameters in question. Other deviations from the conditions represented only in a general way may be adopted for adaptation to special requirements in each individual case.

FIG. 13 shows diagrammatically the use of nozzles operable to produce floating conditions and to convey individual cut sheets to a stack. The pair of rolls 34 grip each of a series of consecutive individual sheets 35, which are delivered by a processing machine, such as a guillotine, a printing machine, a punching machine for cutting sheets to size, or the like. The pair of rolls are succeeded by an air duct 36, which is U-shaped like the electrodes, and which is provided on the underside with lower nozzles 14, which have all a main airflow direction that is the same as the direction of travel of the workpieces.

The blowers 37 deliver air through these ducts 36 to the lower nozzles 14. All lower nozzles 14 are mounted so that the main airflow direction is identical with the direction of travel of the workpieces.

FIG. 14 is a bottom plan view showing the ducts 36, which are uniformly distributed over the width of the sheets which may have to be treated. The main flow direction 21 of the air discharged from each lower nozzle 14 is the same as the direction of travel of the workpieces. Rods 38 are disposed at the end of the air ducts 36 between the several bar-shaped nozzles and guide the leading edge of each sheet as it moves under the duct. It is surprising that the sheet remains suspended throughout its length and width under the lower nozzles 14 at a very small distance from said nozzles without buckling, fluttering or being subjected to other disturbances. When it is desired to deposit this sheet, the latter must be subjected to a force in the direction to the stacking station 39. This force may be produced by an airflow pulse, which is initiated by a photodetector having a transmitter 40 and a receiver 41 so that compressed air is discharged from the nozzles 42 onto the trailing end of the sheet 35 for a short time when the sheet has reached the delivery position 43 and this trailing end is urged toward the stack whereas the action of the blower-induced flow of air from the large number of lower nozzles 14 is overcome for a short time so that the sheet drops.

The mode of operation of the embodiment shown by way of example on the drawings will be understood in view of the introductory remarks. The means which have been shown and described can be used to move a floating workpiece through a treating space which is defined only on one side by blow boxes which in accordance with the invention are provided with nozzles designed in accordance with the invention, whereas opposing blow boxes or opposing blow nozzles disposed on the other side of the web 1, possibly in a suitably staggered arrangement, are no longer required, although such an arrangement of nozzles on both sides is not excluded from the scope of the invention. If the surface of a web 1 having a center plane provided on its upper side with a coating which precludes the use of stationary or movable, rigid or elastically yielding walls above the center plane, possibly owing to electric and particularly electrostatic conditions, the provision of nozzles designed according to the invention and disposed only on one side will enable the maintenance of the center plane of the web 1 in a floating condition such as is indicated in the drawing. In practice, this plane will not be a mathematically defined plane but a statistically determined condition which results from a balance of motions which involve the formation of small waves similar to a sine function.

The invention covers also individual ones of the features which have been described hereinbefore as well as the combination of all said features and of any part of said features, provided that such combinations of parts of the features are technically useful and practicable, even though the novel technical effects which may be achieved in each case may not have been stated and may not have been specifically described. All details shown in the drawings are considered described as such and in their functional relation.

What is claimed is:

1. A process of handling workpieces which have a large surface area relative to their thickness, in which process said workpieces are contacted at least on one side with a gaseous and/or vaporous fluid and are at least maintained in a floating condition during such treatment of the workpiece, said process comprising the steps of transforming said fluid into source flows which are distributed over the workpiece surface contacted by the flowing fluid, expanding said source flows which are distributed over the workpiece surface contacted by the flowing fluid, expanding said source flows so that they have divergent radial jets extending from said source in a top plan view taken onto said workpiece surface contacted by the flowing fluid, imparting to said divergent radial jets a slightly convexity toward said workpiece in a view taken at right angles to the first-mentioned direction of view and the direction of flow and parallel to a center plane of the workpiece, and subsequently transforming said radial jets which are convex toward the workpiece into a plane flow which is parallel to the center plane of the workpiece.

2. A process as set forth in claim 1, in which said flowing fluid is caused to contact said workpiece so as to maintain the same in a floating condition and to convey said workpiece in the direction of flow of said fluid in contact with the workpiece.

3. A process as set forth in claim 1, in which said divergent radial jets have an angle of divergence of at least 90°.

4. A process as set forth in claim 1, in which said divergent radial jets have an angle of divergence of at most 180°.

5. A process as set forth in claim 1, in which said divergent radial jets have an angle of divergence between 105° and 135°.

6. A process as set forth in claim 1, in which said divergent radial jets have an angle of divergence of approximately 120°.

7. A method as defined in claim 1 and including the step of subjecting the workpiece to the action of microwave energy.

8. A process as set forth in claim 7, in which said flowing fluid is caused to contact said workpiece so as to maintain the same in a floating condition and to convey said workpiece in the direction of flow of said fluid in contact with the workpiece.

9. A process of handling endless webs which have a large surface area relative to their thickness, in which process said webs are contacted at least on one side with a gaseous and/or vaporous fluid and are at least maintained in a floating condition during such treatment of the web, said process comprising the steps of transforming said fluid into source flows which are distributed over the web surface contacted by the flowing fluid, expanding said source flows so that they have divergent radial jets extending from said source in a top plan view taken onto said web surface contacted by the flowing fluid, imparting to said divergent radial jets a slightly convexity toward said web in a view taken at right angles to the first-mentioned direction of view and the direction of flow and parallel to a center plane of the web, and subsequently transforming said radial jets which are convex toward the web into a plane flow which is parallel to the center plane of the web.

10. A process as set forth in claim 9, in which said flowing fluid is caused to contact said web so as to maintain the same in a floating condition and to convey said web in the direction of flow of said fluid in contact with the web.

11. A process as set forth in claim 9, in which said web which is in a floating condition and in contact with flowing gaseous and/or vaporous fluid is subjected to the action of microwave energy.

12. A process as set forth in claim 9, in which said flowing fluid is caused to contact said web so as to maintain the same in a floating condition and to convey said web in the direction of flow of said fluid in contact with the web and said web which is in a floating condition and in contact with flowing gaseous and/or vaporous fluid is subjected to the action of microwave energy.

13. Apparatus for maintaining workpieces which have a large surface area relative to their thickness in floating condition comprising, in combination, a wall which adjoins a space filled with gaseous or vaporous fluid under pressure, said wall having a plane surface facing a workpiece and being substantially parallel thereto, said wall being formed with at least one arcuate discharge slot for discharging of fluid under pressure from said space, said arcuate discharge slot being defined between a first arcuate edge of a first wall portion located in one plane with the remainder of said wall and a corresponding arcuate edge spaced in a direction normal to said plane surface from said first arcuate edge and provided on second wall portion which has a divergent guide surface facing the workpiece and merging with said plane surface of said wall and guiding the fluid which has flown through said discharge slot.

14. An apparatus as defined in claim 13, wherein said second wall portion has in a plan view viewed from the workpiece a configuration of a circular sector.

15. An apparatus as defined in claim 13, wherein the distance of said guide surface in said direction from said plane surface gradually decreases from said second arcuate edge to the transition between said guide surface and said plane surface.

16. An apparatus as defined in claim 13, wherein said second wall portion has in a plan view viewed from the workpiece a configuration of a circular sector, and wherein the distance of said guide surface in said direction from said plane surface gradually decreases from said second arcuate edge to the transition between said guide surface and said plane surface.

17. An apparatus as defined in claim 14, and including transitional wall portions between said second wall portion and the remainder of said wall and extending radially outwardly from opposite ends of said arcuate slot, said transitional surfaces diverge in the direction of flow of said fluid through said discharge slot and the angle included between said divergent transitional surfaces is between 90°–180°.

18. An apparatus as defined in claim 13, wherein the height of said discharge slot is between one-twentieth and one-third of the radius of curvature of said arcuate edges.

19. An apparatus as defined in claim 13, wherein said guide face is concavely curved toward the workpiece between said arcuate edge and the transition of said guide surface with said plane surface, the radius of curvature of said concave curvature being a multiple of the radius of curvature of said arcuate edges.

20. An apparatus as defined in claim 19, wherein said guide surface is convexly curved toward said workpiece at the transition of said guide surface with said plane surface.

* * * * *